US008718992B2

(12) United States Patent
Verscheure (10) Patent No.: US 8,718,992 B2
(45) Date of Patent: May 6, 2014

(54) METHOD FOR HISTORY MATCHING OF A GEOLOGICAL MODEL COMPRISING A SUB-SEISMIC FAULT NETWORK

(75) Inventor: Marius Verscheure, Paris (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 380 days.

(21) Appl. No.: 13/026,395

(22) Filed: Feb. 14, 2011

(65) Prior Publication Data

US 2011/0208499 A1 Aug. 25, 2011

(30) Foreign Application Priority Data

Feb. 22, 2010 (FR) ...................... 10 00708

(51) Int. Cl.
*G06G 7/50* (2006.01)

(52) U.S. Cl.
USPC ............................................................ 703/9

(58) Field of Classification Search
None
See application file for complete search history.

(56) References Cited

U.S. PATENT DOCUMENTS

| 5,661,698 | A | 8/1997 | Cacas | |
|---|---|---|---|---|
| 6,618,695 | B1 | 9/2003 | Hu et al. | |
| 6,922,662 | B2 * | 7/2005 | Manceau et al. | 703/10 |
| 7,483,822 | B2 | 1/2009 | Le Ravalec-Dupin et al. | |
| 8,386,226 | B2 * | 2/2013 | Craig | 703/10 |
| 8,392,165 | B2 * | 3/2013 | Craig et al. | 703/10 |
| 8,437,962 | B2 * | 5/2013 | Craig | 702/11 |

FOREIGN PATENT DOCUMENTS

WO WO 02/082352 A1 10/2002

OTHER PUBLICATIONS

L. Y. Hu et al, "Gradual Deformation and Iterative Calibration of Sequential Stochastic Simulations" Mathematical Geology, vol. 33, No. 4, May 2001.*
Jenni, Sandra, et al: "History Matching of Stochastic Models of Field-Scale Fractures: Methodology and Case Study", Society of Petroleum Engineers, SPE, No. SPE90020, Sep. 26, 2004-Apr. 29, 2004, pp. 1-11, XP002603212, Houston, Tx.*
C. Darcel, O. Bour, P. Davy, and J. R. de Dreuzy. Connectivity properties of two-dimensional fracture networks with stochastic fractal correlation. Water Resour. Res ., 39, Oct. 2003.*
C Paredes, F.J Elorza, Fractal and multifractal analysis of fractured geological media: surface-subsurface correlation, Computers & Geosciences, vol. 25, Issue 9, Nov. 15, 1999, pp. 1081-1096.*
Tran et al., Modelling Discrete Fracture Networks Using Neuro-Fractal-Stochastic Simulation, 2006, Journal of Engineering and Applied Sciences 1 (2), pp. 154-160.*
Cacas, MC et al: "Nested Geological Modelling of Naturally Fractured Reservoirs", Petroleum Geoscience, 7 :S43-S53, 2001.
Bour, Olivier et al: "Connectivity of Random Fault Networks Following a Power Law Fault Length Distribution", Water Resources Research, vol. 33, No. 7, pp. 1567-1583, Jul. 1997.

(Continued)

*Primary Examiner* — Omar Fernandez Rivas
*Assistant Examiner* — Robert Brock
(74) *Attorney, Agent, or Firm* — Antonelli, Terry, Stout & Kraus, LLP.

(57) ABSTRACT

A history matching method by gradual deformation of a fault network associated with a geological model is disclosed having application to notably petroleum reservoir development. A fault network is constructed by drawing fault centers in a multifractal density map constructed by a multiplicative cascading and by generating a fault for each fault center. History matching of the model is then performed by deforming the fault network through continuous deformation of the multifractal density map, then by reiterating the center drawing and fault generation stages.

15 Claims, 5 Drawing Sheets

| $P_4 \times P_1$ | $P_1 \times P_1$ | $P_3 \times P_3$ | $P_2 \times P_3$ |
|---|---|---|---|
| $P_2 \times P_1$ | $P_3 \times P_1$ | $P_1 \times P_3$ | $P_4 \times P_3$ |
| $P_1 \times P_4$ | $P_3 \times P_4$ | $P_4 \times P_2$ | $P_3 \times P_2$ |
| $P_4 \times P_4$ | $P_2 \times P_4$ | $P_2 \times P_2$ | $P_1 \times P_2$ |

(56) References Cited

OTHER PUBLICATIONS

Verscheure, Marius, et al: "History Matching of a Realistic Stochastic Fault Model Using Fractal Geometry and the Gradual Deformation Method", Society of Petroleum Engineers, SPE., No. SPE129759, Jun. 14, 2010-Jun. 17, 2010, pp. 1-11, XP002603211, Barcelona, SP.

Jenny, Sandra, et al: "History Matching of Stochastic Models of Field-Scale Fractures: Methodology and Case Study", Society of Petroleum Engineers, SPE, No. SPE90020, Sep. 26, 2004-Apr. 29, 2004, pp. 1-11, XP002603212, Houston, Tx.

Parney, R., et al: "Fracture and Production Data Integration Using Discrete Fracture Network Models for Carbonate Reservoir Management, South Oregon Basin Field, Wyoming", Society of Petroleum Engineers, SPE, No. SPE60306, 2000, pp. 1-7, XP002603213.

* cited by examiner

METHOD FOR HISTORY MATCHING OF A GEOLOGICAL MODEL COMPRISING A SUB-SEISMIC FAULT NETWORK

BACKGROUND OF THE INVENTION

1. Field of the Invention

The present invention relates to the development of underground media such as petroleum reservoirs. More particularly, the invention relates to a history matching method for a geological model representative of an underground reservoir, wherein the geometry of a fault network is adjusted in order to reproduce by simulation the observed data.

2. Description of the Prior Art

Studying a petroleum field requires constructing models referred to as "geological models" in a broad sense. These models, which are well known and widely used in the petroleum industry, allow determination of many technical parameters relative to, for example, prospecting, study or development of a hydrocarbon reservoir. In fact, the geological model is representative of the structure of the reservoir and of the behavior thereof. It is thus for example possible to determine which zones are the likeliest to contain hydrocarbons, the zones in which it can be interesting/necessary to drill an injection well in order to enhance hydrocarbon recovery, the type of tools to use, the properties of the fluids used and recovered, etc. These interpretations of geological models in terms of "technical development parameters" are well known, even though new methods are regularly developed. It is thus crucial, in the petroleum field, to construct a model as precisely as possible. Integration of all the available data is therefore essential.

A geological model is a model of the subsoil, representative of both the structure and the behavior thereof. Generally, this type of model is represented in a computer. It is then referred to as a numerical model. In two dimensions (2D), it is described as a map. Thus, a map corresponds to an image of pixels with each pixel containing information relative to the behavior of the subsoil being studied (a petroleum reservoir for example). These pixels correspond to a precise geographical position and they are identified by coordinates. When values are assigned to a pixel, by simulation for example, they are referred to as simulation points. The representative image (map or model) is generated on any support (paper, computer screen, etc.).

Petroleum reservoirs are generally highly heterogeneous and fractured porous media. In order to obtain the best possible image of the reservoir, it is therefore necessary to integrate the faults, in addition to the static and dynamic data.

A fault is a surface generated by a shear fracture separating the rock by creating a throw between two adjacent blocks. There are two types of faults in a reservoir. Seismic faults are large objects visible from seismic velocity surveys. They are objects of large size (several hundred meters to some kilometers). Sub-seismic faults are objects whose size is not sufficiently large for them to be visible in seismic images.

A geological model is a representation of the petroleum reservoir where the geometry of the faults is generally represented by Boolean objects. In two dimensions, the faults are represented by lineaments, in three dimensions by surfaces. Properties such as porosity, permeability, effective opening, etc., are associated with each object.

The seismic faults are added in a deterministic manner, as seen in seismic surveys. The sub-seismic faults that are invisible are added using construction methods referred to as "probabilistic" due to the limitation of available information (limited number of wells, etc.). The geological models constructed from these probabilistic methods are therefore referred to as "stochastic models".

Fractal methods can be mentioned among others to take into account the auto-similar character for constraining the stochastic model.

Since it is impossible to directly simulate the flow in an object model (that is a geological model where the faults are represented by objects), the faults are discretized on a simulation grid. For each cell of the flow model, the properties equivalent to the presence of a fault (permeability, porosity, etc.) are calculated. This simulation grid allows obtaining simulated production data, that is data which are compared with the real data. If the difference is too great, the geological model is modified iteratively until the simulations are comparable with the observations.

The object of the method is to gradually deform the fault network with a view to matching.

There is a method allowing hydrodynamic matching of a fracture network in relation to production data. It is based on the gradual deformation of a Boolean model by acting upon the Poisson drawing of the position of the objects. This method is described in U.S. Pat. No. 7,483,822 or French Patent 2,857,764. The application to fracture models is described in:

Lin Y. Hu and Sandra Jenni: History Matching of Object-Based Stochastic Reservoir Models. SPE Journal, 10(3) no 81503, September 2005.

In this method, the positions of all the faults are modified to reproduce the production history. The displacement of the faults is controlled by a reduced number of parameters, which can then be optimized to reduce the difference between simulated data and production data.

This method however involves several drawbacks. First, the input parameters of the algorithm that generates the faults are arbitrary and cannot be related to field observations. Second, the models generated are not realistic from a geological point of view.

Fractal methods are frequently used to model faults by stochastic methods. The latter allow generation of networks of auto-similar objects on various observation scales. The advantage of these methods is to generate realistic objects. Such methods are described in:

M C. Cacas, J M. Daniel, and J. Letouzey. Nested Geological Modelling of Naturally Fractured Reservoirs. Petroleum Geoscience, 7:S43-S52, 2001, Bour, O and Ph. Davy, Connectivity of Random Fault Networks Following a Power Law Fault Length Distribution, Water Resour. Res. 33 (7), 1567-1583, 1997.

The drawback of these methods is that they do not allow modification of the fault generated networks to perform hydrodynamic matching.

SUMMARY OF THE INVENTION

The invention relates to a method of developing an underground medium from history matching, wherein a fault network is constructed by a fractal description of the fault system, and this network is modified by a gradual deformation based on a multiplicative cascading.

The invention is a method of developing an underground medium from a flow simulation grid comprising a set of cells discretizing the underground medium, and from dynamic data measurements, wherein a fault network is associated with the flow simulation grid. The method comprises the following stages:

a. Constructing the fault network by carrying out the following stages:

i—Constructing a multifractal density map by a multiplicative cascading;
ii—Constructing a fault center map by performing a random draw in the multifractal density map; and
iii—Generating a fault for each fault center;
b. Carrying out history matching of the grid by deforming the fault network through continuous deformation of the multifractal density map and then reiterating stages ii and iii in order to reproduce by flow simulation the dynamic data; and
c. Developing the medium by a development scheme defined from matched grid.

The multifractal density map can be constructed by carrying out the following stages:
Selecting a fractal dimension Df for the fault centers to be generated; and
Constructing the multifractal density map by multiplicative cascading comprising subdividing each cell into p sub-cells, assigning a weight to each one of the sub-cells with the weights being defined according to the fractal dimension, multiplying each weight of each sub-cell by the weight of the cell before subdivision with the process of subdividing/multiplying by the weights of the previous iteration being repeated until a selected resolution is obtained.

According to an embodiment, it is possible to subdivide each cell into four cells, and to assign new weights $P_1$, $P_2$, $P_3$ and $P_4$ respecting the following system upon each subdivision:

$$\begin{cases} P_1 + P_2 + P_3 + P_4 = 1 \\ P_1^2 + P_2^2 + P_3^2 + P_4^2 = 0.5^{Df} \\ P_i \geq 0 \end{cases}$$

According to another embodiment, the same set of weights can be used again for each subdivision.

A fault can be generated for each fault center by considering an orientation selected or drawn in a first probability law and a fault length selected or drawn in a second probability law.

According to the invention, continuous deformation of the multifractal density map is preferably performed by defining the weights from at least one parameter and by modifying this parameter.

Finally, according to the invention, the position of the faults can be modified locally, after defining geographical zones on the flow simulation grid.

BRIEF DESCRIPTION OF THE DRAWINGS

Other features and advantages of the method according to the invention will be clear from reading the description hereafter of non-limitative embodiment examples, with reference to the accompanying figures wherein.

DETAILED DESCRIPTION OF THE INVENTION

The method according to the invention comprises four main stages:
1. Data acquisition
2. Construction of a fault network
3. Gradual deformation of the fault network
4. Dynamic data matching 1. Data Acquisition The invention relates to the development of an underground medium such as an oilfield. Studying an oilfield requires constructing a geological model. A spatial discretization of the oilfield is first constructed. This discretization is referred to as "simulation grid" because it allows carrying out flow simulations by software referred to as a "flow simulator". Such a grid has a set of cells. The grid can be two- or three-dimensional. Petrophysical properties such as porosity, permeability, pressures, etc., are associated with each cell. These data are generally acquired at the level of wells drilled through the underground formations of the oilfield. From this information, values are extrapolated to the whole of the grid.

Creation of a simulation grid is well known.

To achieve matching of the geological model, dynamic data are measured in the developed field. It can be production data such as the volumes of fluids produced for each well or 4D seismic data.

Finally, according to the invention, a fault network is associated with this geological model. The following information therefore has to be defined or acquired:
a fault length law which is generally a power law;
a fault orientation law which is generally a Fisher type probability law. An orientation can also be imposed for different fault families from an orientation map as is known in the art; and
a fractal dimension which is denoted by Df, of the population of faults.

This law and this dimension can be obtained from the analysis of fracturations on cores or logs. They can also be defined by a geologist based on the geologist's knowledge of the developed oilfield region.

2. Construction of a Fault Network

Figure 4:
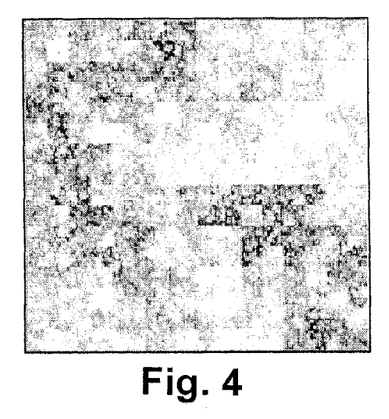
FIG. 4 shows an example of a multifractal density map obtained after a predetermined number of iterations.

Creating a fault network that respects the static parameters (fractal dimension, length law, number of fractures) is done in three stages:
a—Constructing a multifractal density map (FIG. 4)

What is referred to as "multifractal density map" is a map defining a quantity having an auto-similar character. Auto-similarity is the characteristic of an object where similarities can be found by observation on different scales. The notion of auto-similarity is described by means of the multifractal approach.

According to the invention, generating a multifractal density map is done by a multiplicative cascading. This algorithm is described within the framework of a two-dimensional grid, but it can be readily generalized to the case of a one-dimensional (fractures along a well) or three-dimensional grid.

A subgrid size is selected for the flow simulation grid. The size of this subgrid corresponds to the number of cells in a direction with the subgrid forming a square. For example, a subgrid of size 2 is a 2×2 square grid.

Figure 1:
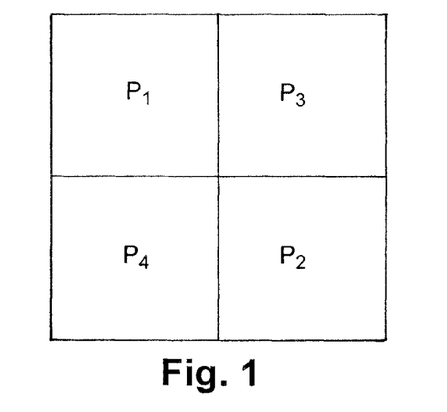
FIG. 1 illustrates the initialization of the multiplicative cascade algorithm.

For each of the 4 cells of the subgrid, a weight $P_i$ is assigned, as illustrated in FIG. 1, which shows the 2×2 subgrid.

These weights must meet certain conditions, notably linked with the fractal character to be imposed on the density map.

According to an embodiment, weights $P_i$ meet the following conditions:

$$\begin{cases} P_1 + P_2 + P_3 + P_4 = 1 \\ P_1^2 + P_2^2 + P_3^2 + P_4^2 = 0.5^{Df} \\ P_i \geq 0 \end{cases} \quad (1)$$

with Df being the fractal dimension of the population of points (fault center) to be obtained.

Figure 2:
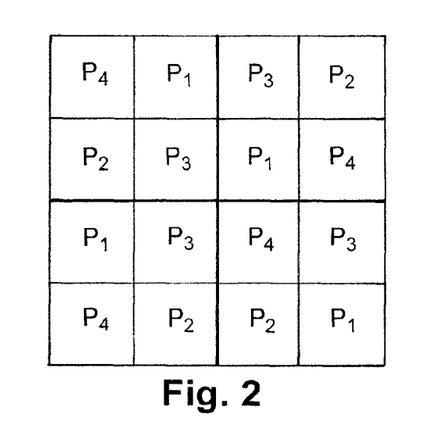
FIG. 2 illustrates the subdivision of each cell into four cells, and the assignment of a random arrangement of weights $P_i$ to each one.

According to another embodiment, instead of generating the weights by system (1), they can be drawn in a probability law defined by the user which may, for example, be a lognormal law. The construction allows obtaining an auto-similar structure but it does not allow selection of the fractal dimension of the generated points. The latter depends on the statistical parameters of the probability law used. Each cell of the subgrid is then subdivided into 4 identical subcells (of same shape and dimensions). One of the initial weights $P_i$ is randomly assigned to each subdivided subcell. FIG. 2 illustrates this stage.

Figure 3:
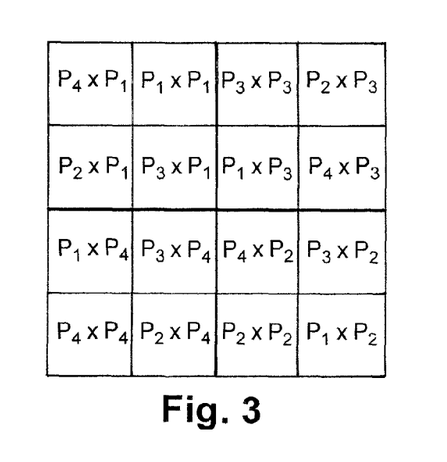
FIG. 3 illustrates the stage of multiplying the values of the subdivided cells by those before subdivision.

The weights of each subcell are then multiplied by the weight of the cell before subdivision as illustrated in FIG. 3.

According to an embodiment, the same set of weights is used again for each subdivision. According to another embodiment example, new weights are calculated by respecting system (1) upon each subdivision.

Figure 5:
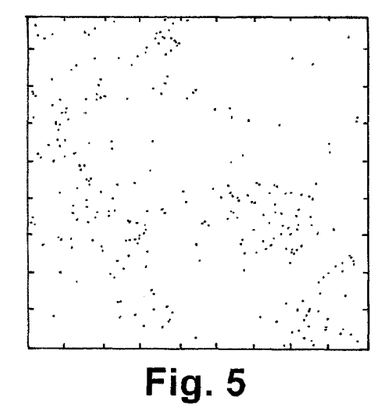
FIG. 5 shows the fault center map obtained from the multifractal density map of FIG. 4.

The process of subdividing/multiplying by the weights of the previous iteration is repeated until a satisfactory resolution is obtained, as illustrated in FIG. 4. This resolution is a parameter for the user and it depends on the precision which is sought.

b—Positioning the fault centers (FIG. 5)

The fractal density map generated by the multiplicative cascading method is used to generate a population of points corresponding to the centers of the sub-seismic faults.

A population of points constrained by this density map is therefore drawn. A sequential method based on the inversion of the distribution functions can be used.

Distribution functions F(X) and $F_{Y|X}(Y)$ are therefore calculated by the fractal density map, where X and Y correspond to the coordinates of the points of the map (centers of the cells of the grid). The distribution function of a real random variable characterizes the probability law of the real random variable. The distribution function corresponds to the numerical integral of the density map. Then, the coordinates x and y of each point are calculated from uniform numbers u and v such that $x=F^{-1}(u)$ and $y=F^{-1}_{y|x}(v)$. Such a method is described in the following document:

S. Jenni, 2005, "Calage de la Géométrie des Réseaux de Fractures aux Données Hydrodynamiques de Production d'un Champ Pétroller", Thesis, Pierre et Marie Curie University.

With this method, a continuous modification of the density map generates a continuous modification of the position of the points.

Furthermore, the multifractal character of the density map allows obtaining a population of fractal points.

Figure 6:
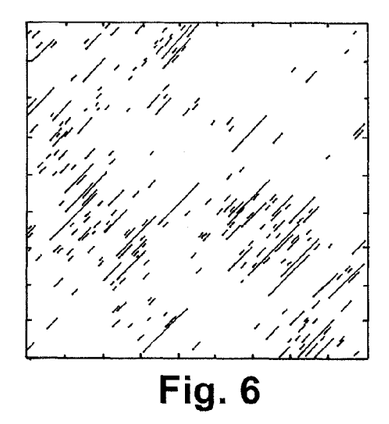
FIG. 6 illustrates a fault network whose lengths are drawn in a power law, obtained from the map of FIG. 5.

FIG. 5 illustrates the result of this stage, resulting from the processing of FIG. 4.

c—Constructing the faults (FIG. 6)

Once the fault centers positioned, a fault is generated for each center by considering an orientation and a fault length.

The faults are modelled by lineaments that follow the length and the orientation selected. The obtained object model thus cannot be used directly to carry out flow simulations. Therefore its equivalent properties are calculated on the simulation grid (permeabilities and porosities) as it is known.

The fault lengths are for example drawn in the length law, then randomly assigned to each fault center.

The orientations can be drawn in a probability law (Fisher law for example) or imposed by an orientation map.

FIG. 6 illustrates the result of this stage, resulting from the processing of FIG. 5.

3. Gradual Deformation of the Fault Network

The constructed fault network thus can then be gradually modified to, for example, respect dynamic data for example (which is called history matching).

According to the invention, the fault network is gradually deformed by continuous deformation of the multifractal density map (FIG. 4) constructed in stage 2. and then by regeneration of the fault centers. Continuous deformation of position is thus obtained. This is referred to as "multiplicative cascade deformation".

Gradual deformation of the multiplicative cascade executes plural times the algorithm (stage 2) by varying the deformation parameters continuously. The stages thus are:

a—Multifractal density map deformation b—Fault centers positioning (identical stage 2.b)

c—Fault construction (identical stage 2.c).

The result is a set of maps whose appearance varies continuously. This set of maps represents a chain of gradual deformations of the fault network.

Deformation of the multifractal density map is achieved by modifying continuously weights $P_i$. Weights $P_i$ are therefore parametrized. That is the weights are defined from at least one parameter. This parameter is referred to as "deformation parameter" because a modification of its value causes a modification of the value of the weights and therefore a modification of the multifractal density map, and consequently a modification of the fault network occurs. Four values of $P_i$ can be identified, which are continuous functions in relation to a single parameter θ:

$$\{P1(\theta), P2(\theta), P3(\theta), P4(\theta)\} \quad (2)$$

The following parametrization of weights $P_i$ can, for example, be used:

$$\begin{cases} P_1 + P_2 + P_3 + P_4 = 1 \\ P_1^2 + P_2^2 + P_3^2 + P_4^2 = \alpha \end{cases}$$

$$\Leftrightarrow \begin{cases} P_1 = \frac{1}{2}\left(1 - P_3 - P_4 + \sqrt{-1 + \alpha + 2P_3 - 3P_3^2 + 2P_4 - 2P_3P_4 - 3P_4^2}\right) \\ P_2 = \frac{1}{2}\left(1 - P_3 - P_4 - \sqrt{-1 + \alpha + 2P_3 - 3P_3^2 + 2P_4 - 2P_3P_4 - 3P_4^2}\right) \end{cases}$$

A relation is added between $P_3$ and $P_4$ in order to reduce the degrees of freedom of the system. For example:

$$\begin{cases} P_1 + P_2 + P_3 + P_4 = 1 \\ P_1^2 + P_2^2 + P_3^2 + P_4^2 = \alpha \\ \frac{1}{4} - P_4 - P_3 = 0 \end{cases}$$

$$\Leftrightarrow \begin{cases} P_1(\theta) = \frac{1}{8}\left(3 - \sqrt{-11 + 32\alpha + 16\theta - 64\theta^2}\right) \\ P_2(\theta) = \frac{1}{8}\left(3 + \sqrt{-11 + 32\alpha + 16\theta - 64\theta^2}\right) \\ P_3(\theta) = \frac{1}{4} - \theta \\ P_4(\theta) = \theta \end{cases}$$

When performing the iterations of the multiplicative cascade algorithm (stage 2), an arrangement of weights $P_i$ is randomly drawn upon each cell subdivision. In order to obtain a continuous deformation of the map, the whole of the arrangements has to be rigorously identical for each element of the gradual deformation chain. What is referred to as the "gradual deformation chain" is all the maps obtained upon variation of the gradual deformation parameters. For the modification of the maps to be continuous, the arrangements of $P1(t)$, $P2(t)$, $P3(t)$ and $P4(t)$ that are performed at each iteration have to be identical.

Once the arrangements are fixed, the value of parameter necessary for calculating the weights has to be determined.

A single value can, for example, be used for all the weights. Weights $P_i$ are then identical for each subdivision. Parameter $\theta$ is then the parameter to be varied in order to deform the map.

4. History Matching

The goal of history matching is to adjust certain parameters of a geological reservoir model to reproduce dynamic data measured in the field. These data can be production data or data obtained from repeated seismic surveys (4D).

According to the invention, the fault network of the geological model is modified. History matching then carries out the following stages, starting from a first fault network constructed according to stage 2:

Measuring dynamic data in the field;
Simulating the dynamic data by a flow simulator for the initial fault network; and
Deforming continuously the fault network of the geological model according to stage 3 in order to minimize the difference between the measured dynamic data and the simulated dynamic data.

The latter stage is carried out by an optimizer that minimizes an objective function. This objective function measures the difference between the observed and the simulated dynamic data. Thus, if the hydrodynamic response of the simulation differs from the observed data, the optimizer modifies the position of the fractures by acting upon parameter $\theta$, until the hydrodynamic response is satisfactory, which is until the difference between the observed and simulated dynamic data is small or no longer decreases. Continuous displacement of the fractures allows making the objective functions as linear as possible, thus accelerating optimization.

Variants

According to an embodiment, if global optimization of the position of the faults does not allow obtaining a satisfactory match, the position of the faults is modified locally.

Geographical zones are therefore defined in the flow simulation grid. Such a zone is defined by selecting the cells for one of the refinement levels used during the multiplicative cascades. If a zone is to be coarsely defined, a low refinement level is selected and in the opposite case, a high refinement level is selected. Definition of the zones can be done according to the layout of the wells. It is thus possible to define a zone for each group of Injector/producer wells. Thus, improving the matching of a group of wells is not likely to deteriorate that of another.

Once the zone is defined, weights $P_i$ of the cells contained in the zone are modified by deformation parameters specific to this zone.

According to an embodiment, if the cascade is constructed by weights drawn in a probability law, the gradual deformation is used to deform them. The fractal dimension can then vary during this deformation since it is not imposed from the outset. Gradual deformation is described in for example U.S. Pat. No. 6,618,695 or French Patent 2,780,798.

According to another embodiment, if the reservoir to be modelled contains seismic faults, conditioning thereto can be performed. Assuming that the seismic faults are fractal on a large scale, a seismic fault density map is calculated with a coarse resolution. This density can be calculated by calculating the fault length within each cell of a map superimposed on the network. The initial resolution for this map is selected by the user. The map is then refined by the multiplicative cascade algorithm. The low-resolution map is therefore used as the 0 iteration in the multiplicative cascade algorithm.

Embodiment Example

The history matching method is illustrated in the following example, wherein a reference fault network is constructed. That is the network is reconstructed from the method and then the method is applied.

Figure 7:
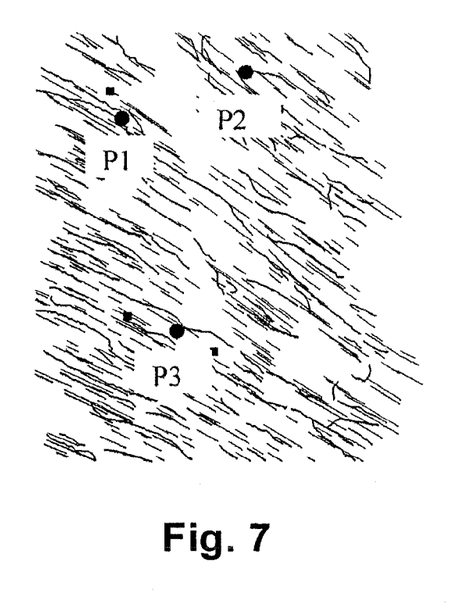
FIG. 7 illustrates a reference fault network illustrating an example of implementation of the method.

The reference network is created by adding 450 sub-seismic faults (stochastic) to a seismic fault network (deterministic). The fractal dimension is 1.65. FIG. 7 illustrates this reference network. The deterministic seismic faults are shown in thick line. The injector wells are represented by squares and the producer wells by circles.

The fault network is discretized on a flow simulation grid. A water-flooding scenario over a period of ten years, which serves as the reference simulation, is simulated. The injector wells located close to producer wells P1 and P2 inject each 800 m³/d. The two injector wells around producer well P3 each inject 400 m³/d. The matrix permeability is 50 mD. The fault permeability is 3.5E5 mD. The fault opening is 0.1 m.

Stage 2 of the Method: Constructing a Fault Network

Figure 8:
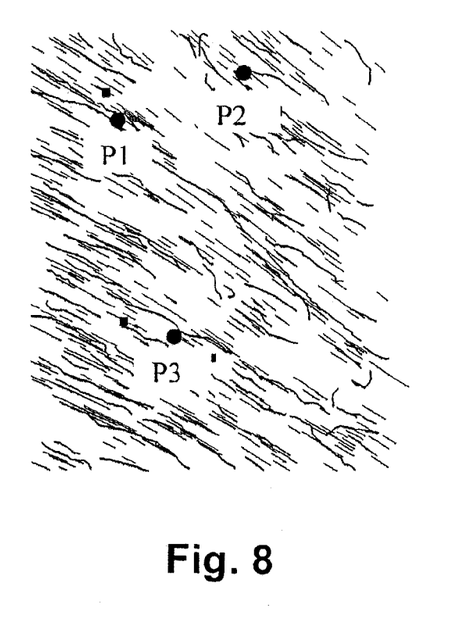
FIG. 8 illustrates the initial fault network constructed according to the invention.

When modifying the $P_i$ arrangement drawing seed that initializes the multiplicative cascade algorithm, a different realization is obtained for the fault network which is illustrated in FIG. 8.

The results of the flow simulations which are performed on this new network (FIG. 8) thus differ from the reference model (FIG. 7). The flow simulations are carried out by known flow simulator software. For Example, the Puma$^{Flow}$ (IFP, France) software can be used for example. The data of the ratio of volume of water/volume of oil produced (water cut) are used because this measurement allows characterization of the connectivity created by the fault network.

Figure 9:
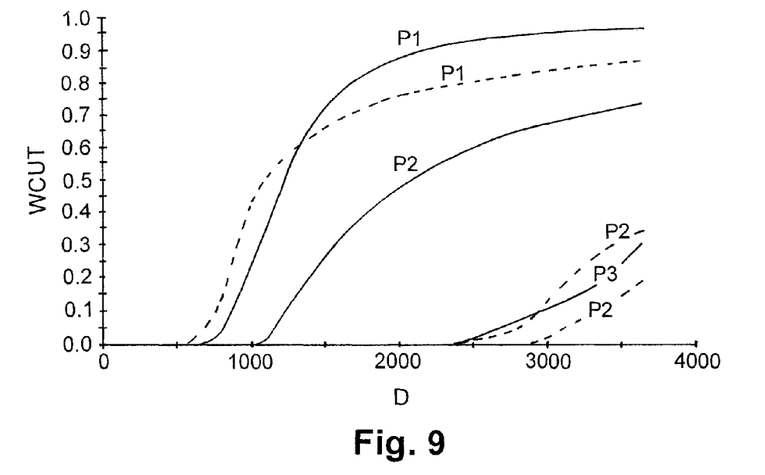
FIG. 9 illustrates the production data obtained from a simulation on the reference network and the initial network.

FIG. 9 illustrates the production data (WCUT—dimensionless) for wells P1, P2 and P3 as a function of time (D) in days. The WCUT data obtained from the flow simulator for the reference fault network (of FIG. 7) are shown in dotted line and those obtained for the initial fault network (of FIG. 8) are shown in full line.

Stage 3 of the Method: Gradual Deformation of the Fault Network

This stage matches with the production data. Modifying the gradual deformation parameter (θ) leads to reduction of the difference between the reference data and the simulated data.

Figure 10:
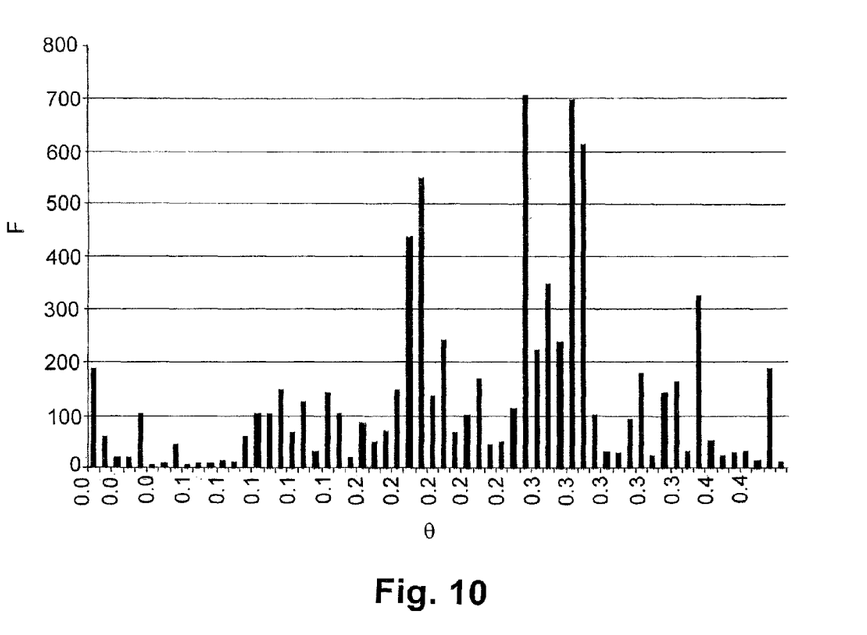
FIG. 10 illustrates the evolution of the objective function during history matching.

The evolution of the objective function during this optimization is illustrated in FIG. 10. The abscissa axis represents the value of θ and the ordinate axis represents the value of the objective function (F). The latter is for example defined as the squared difference between the WCUT measured and simulated data.

Figure 11:
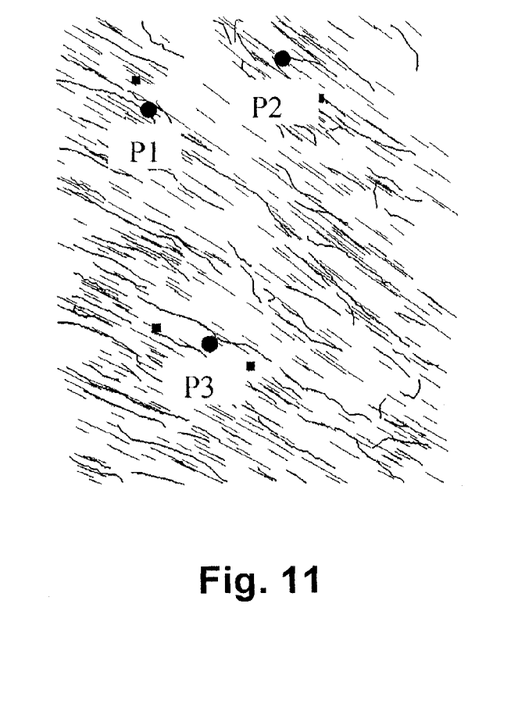
FIG. 11 illustrates the geometry of the fault network allowing to reproduce the production history.

For a certain value of parameter θ (0.033), an optimal fault network is obtained for the geological model. The geometry of this fault network allows reproduction of the production history shown in FIG. 11.

Figure 12:
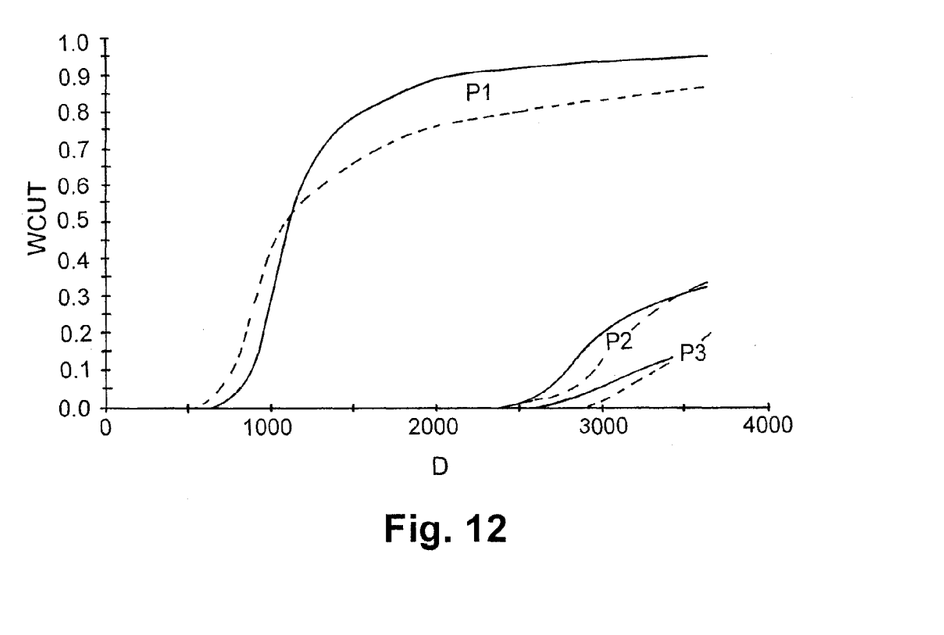
FIG. 12 illustrates the production data obtained from a simulation on the reference network and the optimal fault network.

FIG. 12 illustrates the production data (WCUT—dimensionless) for wells P1, P2 and P3 as a function of time (D) in days. The WCUT data obtained from the flow simulator for the reference fault network (of FIG. 7) are shown in dotted line and those obtained for the optimal fault network (of FIG. 11) are shown in full line.

The method according to the invention allows optimization of the development of the underground medium. In fact, as it is known, constructing a geological model or a flow simulation grid calibrated to the dynamic data allows defining an optimal development scheme for the medium.

The injection capacity of each well running through the underground medium can for example be determined from a fluid flow modelling performed on the flow simulation grid associated with the fault network calibrated to the dynamic data. The production capacity of each well running through the underground medium can then be determined. The production of the fluid, such as hydrocarbons, contained in the underground medium can then be optimized by carrying out at least one of the following stages:

Drilling new wellbores if part of the hydrocarbons cannot be reached during production;

Modifying the injection pressure within the context of an Enhanced Oil Recovery (EOR) technique if the hydrocarbons have difficulty migrating in the reservoir; and Modifying the production flow rate.

The invention claimed is:

1. A method using a computing apparatus to develop an underground medium from a flow simulation grid implemented in a computer comprising a set of cells discretizing the underground medium and from dynamic data measurements wherein a fault network is associated with the flow simulation grid comprising:
   a) constructing the fault network by:
      i. constructing a multifractal density map by a multiplicative cascading;
      ii. constructing a fault center map by performing a random draw in the multifractal density map; and
      iii. generating a fault for each fault center;
   b) carrying out history matching of the grid implemented in a computer by deforming the fault network through continuous deformation of the multifractal density map by defining weights from at least one parameter and by modifying the at least one parameter which causes a modification of the multifractal density map and then reiterating ii and iii to reproduce with a flow simulation, using the modified multifractal density map, the dynamic data; and
   c) developing the underground medium according to a development scheme defined from the history matched grid.

2. A method as claimed in claim 1, wherein the multifractal density map is constructed by:
   selecting a fractal dimension Df for fault centers to be generated; and
   constructing the multifractal density map by a multiplicative cascading comprising subdividing each cell into p sub-cells, assigning a weight to each of the sub-cells wherein the weights are defined according to the fractal dimension, multiplying each weight of each p sub-cell by the weight of the cell before subdivision and repeating subdividing and multiplying by the weights of a previous iteration until a selected resolution is obtained.

3. A method as claimed in claim 2, wherein each cell is subdivided into four cells, and new weights P1, P2, P3 and P4 are assigned upon each subdivision in accordance with a relationship:

$$\begin{cases} P_1 + P_2 + P_3 + P_4 = 1 \\ P_1^2 + P_2^2 + P_3^2 + P_4^2 = 0.5^{Df} \\ P_i \geq 0. \end{cases}$$

4. A method as claimed in claim 2, wherein a same set of weights is used for each subdivision.

5. A method as claimed in claim 1, wherein a fault is generated for each fault center by considering an orientation selected or satisfying a first probability law and a fault length selected or satisfying a second probability law.

6. A method as claimed in claim 2, wherein a fault is generated for each fault center by considering an orientation selected or satisfying a first probability law and a fault length selected or satisfying a second probability law.

7. A method as claimed in claim 3, wherein a fault is generated for each fault center by considering an orientation selected or satisfying a first probability law and a fault length selected or satisfying a second probability law.

8. A method as claimed in claim 4, wherein a fault is generated for each fault center by considering an orientation selected or satisfying a first probability law and a fault length selected or satisfying a second probability law.

9. A method as claimed in claim 1, wherein a position of the faults is locally modified after defining geographical zones on the flow simulation grid.

10. A method as claimed in claim 3, wherein a position of the faults is locally modified after defining geographical zones on the flow simulation grid.

11. A method as claimed in claim 4, wherein a position of the faults is locally modified after defining geographical zones on the flow simulation grid.

12. A method as claimed in claim 5, wherein a position of the faults is locally modified after defining geographical zones on the flow simulation grid.

13. A method as claimed in claim 6, wherein a position of the faults is locally modified after defining geographical zones on the flow simulation grid.

14. A method as claimed in claim 7, wherein a position of the faults is locally modified after defining geographical zones on the flow simulation grid.

15. A method as claimed in claim 8, wherein a position of the faults is locally modified after defining geographical zones on the flow simulation grid.

\* \* \* \* \*